United States Patent
Biggs et al.

[11] Patent Number: 5,942,065
[45] Date of Patent: Aug. 24, 1999

[54] STICKER COMBINABLE SKIN ADHESIVE DECAL AND PROCESS FOR MAKING SAME

[75] Inventors: Edward A. Biggs, Inver Grove Heights; Robert M. Paakh, Cedar; Mark A. Gubash, St. Paul; Gary R. Herman, Inver Grove Heights, all of Minn.

[73] Assignee: InterNatural Designs, Inc., Minneapolis, Minn.

[21] Appl. No.: 08/653,062

[22] Filed: May 23, 1996

[51] Int. Cl.⁶ .................................................... B32B 31/00
[52] U.S. Cl. .......................... 156/90; 156/269; 156/277; 428/41.6; 428/41.8; 428/354; 428/914
[58] Field of Search ............................ 156/277, 90, 269; 428/41.6, 41.7, 41.8, 354, 914

[56] References Cited

U.S. PATENT DOCUMENTS

| | | |
|---|---|---|
| 1,627,407 | 5/1927 | Reese . |
| 1,803,836 | 5/1931 | Bihr . |
| 1,811,804 | 6/1931 | Poschel . |
| 2,578,150 | 12/1951 | Rathke . |
| 2,941,916 | 6/1960 | Akkeron . |
| 3,681,186 | 8/1972 | Findlay et al. . |
| 3,898,357 | 8/1975 | Miller et al. . |
| 4,060,643 | 11/1977 | Blanks . |
| 4,105,483 | 8/1978 | Lin . |
| 4,115,602 | 9/1978 | Bullard . |
| 4,322,467 | 3/1982 | Heimbach . |
| 4,472,537 | 9/1984 | Johnson . |
| 4,522,864 | 6/1985 | Humason et al. . |
| 4,935,288 | 6/1990 | Honaker . |

*Primary Examiner*—Jenna Davis
*Attorney, Agent, or Firm*—Gerald E. Helget; Mackallm Crounse & Moore, PLC

[57] ABSTRACT

The skin adhesive decal is a combination of a multi-color flexographically printed design on a very thin, flexible, extensible, uniform layer of water resistant material covering a water soluble release layer carried by porous decal paper and a uniform deposit of adhesive covering the design and adapted to hold the design against the skin and protect it from disruption. The decal may be combined with a sticker to form a unique singular product capable of separation by the user into its sticker and decal components. The sticker is a combination of a multi-color flexographically printed design on an ink-accepting paper lying atop a very thin, uniform layer of removable pressure sensitive adhesive atop a liner weight backing paper. The process of making the decal enables rapid, continuous manufacture of the multi-color decal by flexographic printing of a multi-color design through the combination of the steps of forming a very thin, uniform water resistant film on a water soluble release layer carried by the decal paper, flexographically printing the design on that film and thereafter depositing on the printed design a uniform layer of pressure sensitive adhesive. The process of making the sticker also includes the rapid, continuous flexographic printing where upon completion, the sticker and decal are glued to a separating liner which allows the user to separate the product into its component decal and sticker parts.

6 Claims, 2 Drawing Sheets

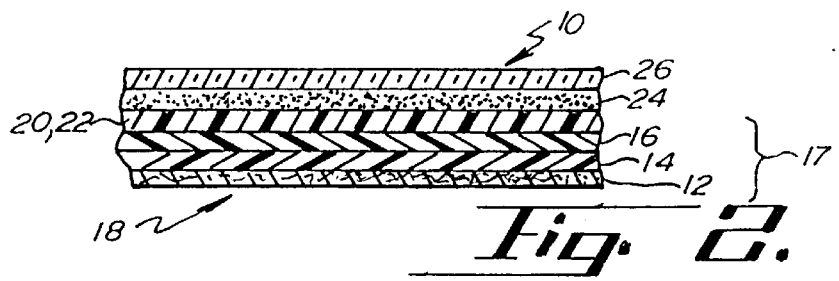
Fig. 2.
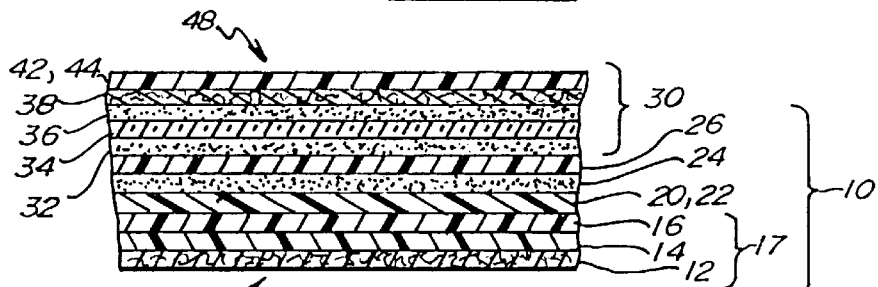
Fig. 3.
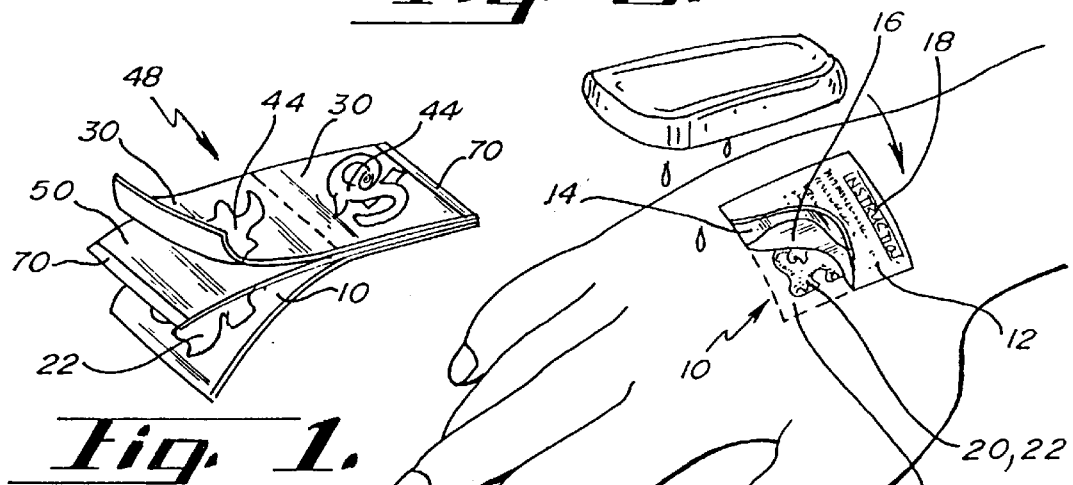
Fig. 1.
Fig. 4.
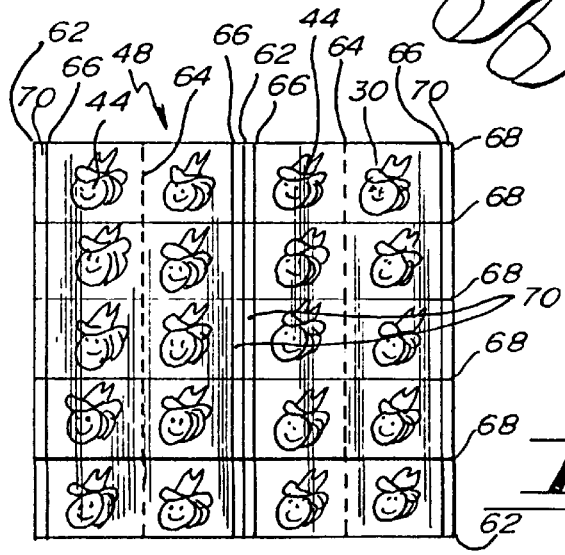
Fig. 6.

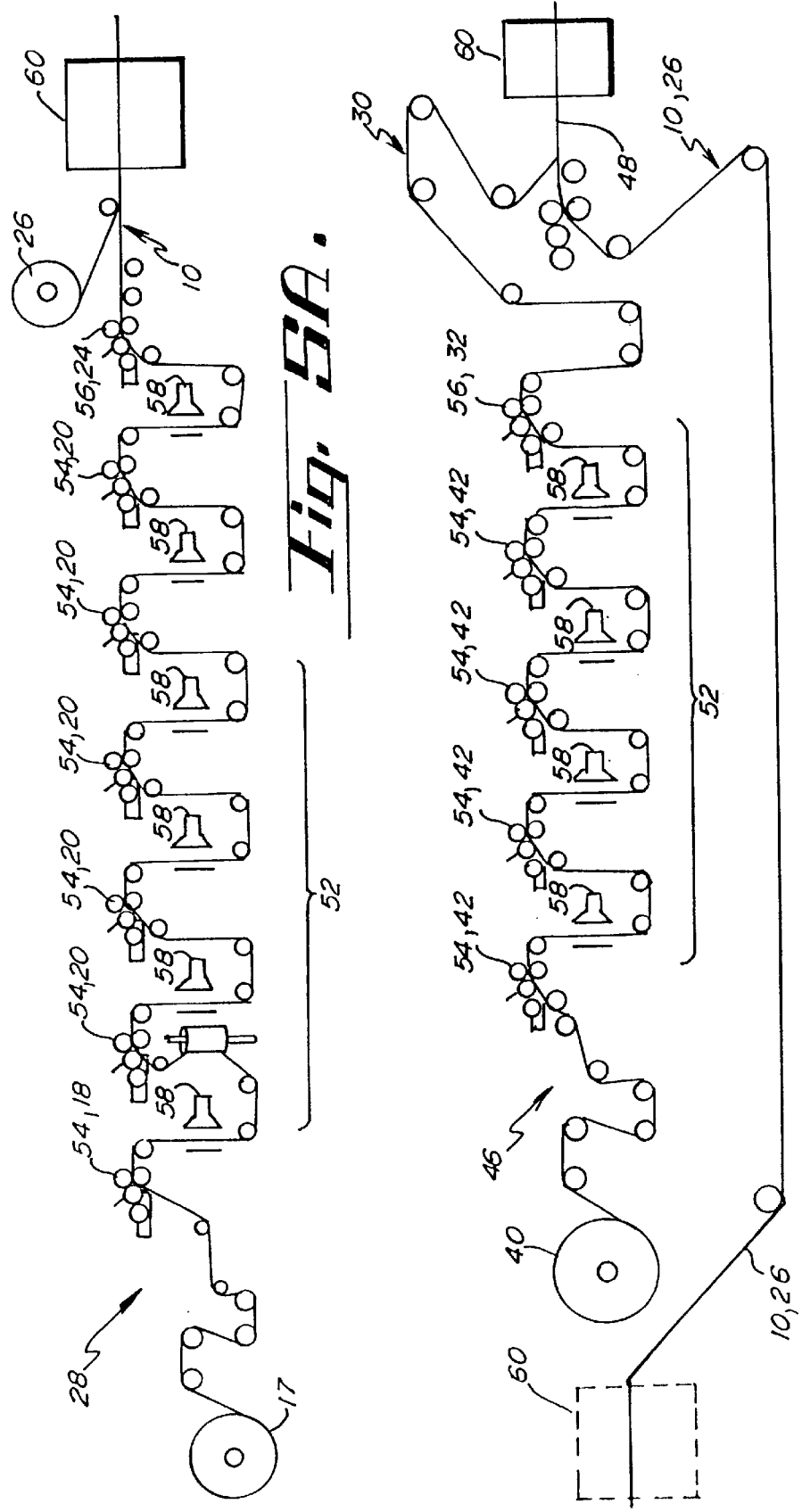

STICKER COMBINABLE SKIN ADHESIVE DECAL AND PROCESS FOR MAKING SAME

BACKGROUND

The invention relates to multi-colored decals, and more particularly to adhesive skin tattoos alone and in combination with multi-color stickers and to the process of making the adhesive skin tattoos alone and in combination with multi-color stickers.

Decals for application to the skin have been made by a silk screen process in which color is deposited in a selected design on the release layer or top of decal paper by wiping the color through the pores of a mesh cloth. A separate hand operation is required for deposition of each color and it has not been possible to insure the desired degree of register accuracy particularly because of the give and stretch of the screen.

In addition to the slowness and expense of the silk screen process, the decals so produced have necessarily been artificial in appearance, particularly when secured to a skin surface. This is an unavoidable result of the thickness of the color layer, which is determined by the thickness of the screen through which the color is deposited. This deposit is incapable of the fine detail, tone gradation and other nuances of original art, i.e. a tattooed skin. Additionally, the thick color deposit tends to crack when subjected to flexing and stretching on skin.

Attempts to print decals on lithograph offset presses are often unsuccessful. Water soluble material from the release layer of the decal paper often clogs the press dampening system and causes the soluble material to adhere to the blanket roller and consequently to disrupt the printed design. Additionally, this procedure requires extensive and time consuming clean-up as well as damage to the press which might require replacement of the roller.

Furthermore, even with new improvements, lithograph offset printing still requires that individual sheets of paper be fed through the decal printing presses. Numerous sheets of paper are inherently difficult to handle. Moreover, if the sheet feeder malfunctions severe delays in the output of product can result and if the paper sheets are misaligned unacceptably imperfect decals can result.

For the foregoing reasons, there is a need for an invention to produce decals for application to the skin that will (1) simulate an actual tattoo when applied to the skin; (2) provide a simple inexpensive process for making the decal including flexographic printing steps in which difficulties caused by water soluble material from the release layer of the decal papers are avoided; and (3) provide a simple continuous process for making the decal thereby avoiding the cumbersome use of individual sheets. There is also a need for a new and unique product which combines the highly improved skin adhesive decal with a sticker giving the user two products in one.

SUMMARY

The skin adhesive decal is a combination of a multi-color flexographically printed design on a very thin, flexible, extensible, uniform layer of water resistant material covering a water soluble release layer carried by porous decal paper and a uniform deposit of adhesive covering the design and adapted to hold the design against the skin and protect it from disruption. The decal may be combined with a sticker to form a unique singular product capable of separation by the user into its sticker and decal components. The sticker is a combination of a multi-color flexographically printed design on an ink-accepting paper lying atop a very thin, uniform layer of removable pressure sensitive adhesive atop a liner weight backing paper. The process of making the decal enables rapid, continuous manufacture of the multi-color decal by flexographic printing of a multi-color design through the combination of the steps of forming a very thin, uniform water resistant film on a water soluble release layer carried by the decal paper, flexographically printing the design on that film and thereafter depositing on the printed design a uniform layer of pressure sensitive adhesive. The process of making the sticker also includes the rapid, continuous flexographic printing where upon completion, the sticker and decal are glued to a separating liner which allows the user to separate the product into its component decal and sticker parts.

An object and advantage of the invention is that the decal for application to the skin that is produced closely resembles an actual tattoo when applied to the skin.

A further object and advantage of the invention is that the method of making the decals provides a simple inexpensive process for making the decal including flexographic printing steps in which difficulties caused by water soluble material from the release layer of the decal papers are avoided.

A further object and advantage of the invention is that the method of making the decals is via a continuous roll of paper thereby avoiding the cumbersome use of individual sheets.

A further object and advantage of the invention is that the decals can be overlaid with a sticker, produced in a similar manner as the decals, so as to provide the user double the fun and double the products all in one package.

DRAWINGS

These and other features, aspects, and advantages of the present invention will become better understood with regard to the following description, appended claims, and accompanying drawings where:

FIG. 1 depicts the combination sticker and decal;

FIG. 2 depicts the elemental layers of the decal;

FIG. 3 depicts the elemental layers of the combination decal and sticker;

FIG. 4 depicts user application of the decal;

FIG. 5A depicts the decal making process;

FIG. 5B depicts the sticker making process and the combining of the sticker and decal; and FIG. 6 depicts the cutting configuration of the combination sticker and decal.

DETAILED DESCRIPTION

The skin adhesive decal 10, generally seen in FIGS. 1, 2 and 4, comprises a backing paper 12, two layers of release varnish 14, one layer of overprint varnish 16, a decal design 22, and skin adhesive 24. The skin adhesive decal making process 28, see FIG. 5A, is a continuous process utilizing flexographic printing. The decal 10 may be packaged alone or it may be combined with a sticker 30, see FIGS. 1 and 3. The sticker 30, generally seen in FIGS. 1, 3 and 6, comprises a sticker paper 40 with a printed design 44. The sticker making process 46, see FIG. 5B, also utilizes a continuous flexographic printing process.

To prepare for flexographic printing of the decal 10, a roll of 60# C2S paper stock 12 with a width of seven and one-half inches, available from Kempf Paper Corporation, 3145 Columbia Ave. N.E., Minneapolis, Minn. 55418, is run through a standard coater. During the coater run the paper 12 which has porous attributes is plied on one side with two layers of a release varnish 14 and one layer of an overprint varnish 16, resulting in a varnished paper stock roll 17, see FIGS. 2 and 3. Each of the varnishes 14, 16 is available from COLORCON™, 415 Moyer Blvd., West Point, Pa. 19486 and is identified by the manufacturer's I.D. code as FGN-4085 and FGN-4121 respectively. The release varnish 14 serves to allow the decal 10 to separate from the paper stock 12 when the user applies the decal 10 to the skin and moistens the back of the porous paper stock 12 with water, see FIG. 4. The overprint varnish 16 serves to allow the release varnished 14 paper 12 to retain decal inks 20, omitting the overprint varnish 16 would cause smearing and/or non-adhesion of the decal inks 20. The overprint varnish 16 also serves to keep the decal 10 as a coherent singular piece, preventing the decal 10 from tearing and cracking when applied to the skin. Alternatively, in place of the 60# C2S paper stock 12 with two layers of release varnish 14 and one layer of overprint varnish 16, a product by the name of SKINCAL™ may be used. SKINCAL™ is water slide decal paper, it is essentially the 60# C2S paper stock 12 with the release varnish 14 layers already applied, and is available from BRITTAINS™ Limited, Commercial Road, Hanley, Stoke on Trent, ST1 3QS, England. The SKINCAL™ must still be plied with one layer of the overprint varnish 16 so that the paper will properly accept and maintain the decal inks 20.

Once the roll of paper stock 12 has been prepared with the appropriate varnish layers 14, 16, it is ready for the decal production process 28, see FIG. 5A, and is fed into a flexographic printing press machine 52, the WEBTRON™ 750 available from Webtron, 2030 W. McNab Road, Fort Lauderdale, Fla. 33309, is suggested. The varnished paper 17 is continuously fed into the machine 52 and through its flexographic press stations 54. At the first station 54, the non-varnished backside of the paper 17 is imprinted with directions on the proper use of the decal 10. A black ink 18, S. S. Black, product I.D. SSK-9 available from Louis O. Werneke Company, 15500 28th Avenue North, Plymouth, Minn. 55447, is used. The paper 17 is then sent through the station dryer 58, run at a temperature range of 150–225° F. to dry the ink 18 and overturned by the machine. The result of the overturn is that the varnished side of the paper stock 17 is now facing up and is in the proper position to be fed through the remaining flexographic press stations 54.

At the first of the remaining flexographic press stations 54, FIG. 5A, the varnished side of the paper stock 17 is imprinted with a black ink 20 outline of the decal designs 22 and run through the station dryer 58; the dryer 58 operating at the same temperature ranges as mentioned above. The outline imprinted paper is then continuously fed through four more flexographic press stations 54 whereby the black ink 20 graphic is printed in with the appropriate ink 20 colors or combination of ink 20 colors. The decal ink 20 colors used in this example include, but are not limited to, cyan, yellow, magenta and opaque white. Each of the non-toxic decal inks 20 is available from COLORCON™, 415 Moyer Blvd., West Point, Pa. 19486 and is identified by the manufacturer's I.D. code as follows: (1) Black— Manufacturer's I.D. Code: FGN-4169; (2) Cyan— Manufacturers I.D. Code: FGN-4120; (3) Yellow— Manufacturer's I.D. Code: FGN 4187; (4) Magenta— Manufacturer's I.D. Code: FGN-4185; and (5) Opaque White—Manufacturer's I.D. Code: FGN-4197. At each colored ink 20 flexographic press station 54 in FIG. 5A, the imprinted paper stock is run through that stations dryer 58 before being routed to the next press station 54; the dryer 58 operating at the same ranges as mentioned above.

At the final press station 56 in FIG. 5A, an even coat of transparent or translucent skin adhesive 24 is plied to the now complete imprinted decal 10. This skin adhesive 24 will hold the decal 10 to the skin in a semi-permanent state; the decal 10 will not be removable with mere soap and water rather some type of solvent such as rubbing alcohol or baby oil will be necessary to remove the decal 10. The skin adhesive 24 is available from SPARTAN™ Adhesives and Coatings Co., 345 East Terra Cotta Avenue, Crystal Lake, Ill. 60014 and is under manufacturer's I.D. Code: SA-96694. See FIGS. 2 and 3 for a depiction of the multiple layers of the decal 10.

At this point, the decal 10 can be prepared for packaging by itself or it can be coupled with an additional sticker product 30. To prepare the decal 10 for packaging by itself, a liner paper 26 is laid over the top of the printed decal 10 to prevent the decal 10 from sticking to the actual packaging. A polystyrene liner is appropriate when it is desirable to see through the packaging and the liner 26 to the decal design 22; the polystyrene is virtually optically clear. Such a polystyrene liner is available from Green Bay Packaging Inc., Coated Products Operation, 1-800-445-4269, its C.P. Designation is: 2.5 mil clear polystyrene liner (025CP). If optical clearness is not a desired quality in packaging or if the decal is being prepared for coupling with the additional sticker product 30, a 40# silicon liner paper, with the silicon side facing the decals 10, may be used. The 40# silicon liner paper, while not optically clear, has the benefit of being much less expensive than the polystyrene. The 40# silicon liner paper, C.P. designation: 42# Solventless—"3" Releaser (43B13), is also available from Green Bay Packaging Inc. Whichever liner 26 is chosen, it is fed by continuous roll feed through the flexographic printing press machine 52, meeting the imprinted decal 10 paper stock after its final pass through the skin adhesive press station 56, see FIG. 5A.

With the liner paper 26 now in place, the decal 10 and liner paper 26 can be fed through the flexographic printing press machine 52 to the cutting station 60 for appropriate cutting and packaging. However, if the additional sticker product 30 is desired, the decal 10 and liner paper 26 can be routed through an additional flexographic printing press machine 52 to meet the sticker product at the end of its production process 46 through additional flexographic press stations 54, see FIG. 5B.

Creating the sticker product 30, see generally FIG. 5B, is very similar to the creation of the decals 10 in that the sticker design 44 is imprinted via continuous feed through a number of flexographic press stations 54. The difference between the sticker 30 and the decal 10 lies in the type of paper, adhesives and inks that are used. For example, the sticker production process 46 begins with a roll of 60# KROMEKOTE™ paper 40. This KROMEKOTE™ paper 40 is the combination of a 55# Lay Flat Silicon Liner 34, a 538 Removable Adhesive 36 and a Hi-Gloss surface paper 38 acceptable of printing inks and it is available from Green Bay Packaging Inc., Coated Products Division, 1-800-445-4269. The KROMEKOTE™ 40 is fed through the flexographic printing press machine 52 where it passes through its first flexographic press station 54 and is imprinted with the black ink 42 graphics of the sticker design 44. The imprinted KROMEKOTE™ 40 is then sent through the station dryer 58, run at a temperature range of 150–225° F. The KROMEKOTE™ 40 is then, by continuous feed, sent through four more flexographic press stations 54 whereby the black ink 42 outline is filled in with the appropriate ink 42 colors or combination of ink 42 colors. The ink 42 colors used in this example include, but are not limited to, cyan, yellow, magenta and opaque white. Each of the inks 42 is available from the Louis O. Werneke Company, 15500 28th Avenue North, Plymouth, Minn. 55447 and is identified by the manufacturers product I.D. as follows: (1) Black—product I.D.: SSK-9; (2) Cyan—product I.D.: SSB-842; (3)Yellow—product I.D.: SSY-840; (4) Magenta—product I.D.: SSR-841; (5) Opaque White—product I.D.: SSW-10. At each colored ink 42 flexographic press station 54 FIG. 5B, the imprinted KROMEKOTE™ is run through that stations dryer 58 before being routed to the next flexographic press station 54; the dryer 58 operating at the same temperature range as mentioned above.

With the sticker's design 44 now complete, the sticker product 30 is ready to be combined with the decal 10 and its liner paper 26. To enable the combination the decal 10 and liner paper 26 are passed through a press station 56, FIG. 5B, in which the decal's 40# Silicon liner paper 26 is plied with a permanent glue 32. The permanent glue 32 is available from H.B. Fuller Company, 2400 Energy Park Drive, St. Paul, Minn. 55108, product I.D.: S-3879 EN. The sticker design 44 atop the KROMEKOTE™ 40, the 40# Silicon liner paper 26 with permanent glue 32 and the decal 10 are then united. In the process the decal's 40# Silicon liner paper 26 is permanently bonded to the KROMEKOTE's 40 bottom layer, the 55# Lay Flat Silicon Liner 34. Thus, producing a singular product, a "stickertoo" 48, containing a peelable sticker 30 and a skin adhesive decal 10; the sticker 30 and decal 10 now separated by a singular liner layer 50 which is actually the combination of the permanently bonded 40# silicon liner 26 and the 55# lay flat silicon liner 34. See FIGS. 1 and 3 for a depiction of the multiple layers of the "stickertoo" 48.

Upon completion of the combination, the "stickertoo" 48 is sent to the next station on the flexographic printing press machine 52, the cutter station 60. Here, the "stickertoos" 48 are cut length wise with the following cuts: (1) metal to metal adjustable lineal cut 62 down the center and at the outer edges; (2) metal to metal adjustable lineal perforated cut 64; and (3) fixed lineal 66 cutting the first layer, the Hi-Gloss 38 imprinted layer, of the 60# KROMEKOTE™ 40 creating peel tabs 70 for the stickers 30. The "stickertoos" 48 are then cut cross-wise 68 with a standard sheeter, see generally FIG. 6 for cutting diagram. The result is a singular product containing two peelable stickers 30 with peel tabs 70 at the outer edges, a perforated cut 64 down the center and two skin adhesive decals 10 located directly underneath, see FIG. 1. The decals 10 are held gently to the singular liner layer 50, which separates it from the sticker 30, by the tackiness of the decal's skin adhesive 24. The decal 10 is easily peeled away from the singular liner layer 50 without any damage to the sticker 30, decal 10 or decal skin adhesive 24.

To employ the stickers 30 one need only break the peel tab 70, pull the sticker 30 away from the singular liner layer 50, and separate the two stickers 30 at the perforated center cut 64, FIG. 1. To employ the skin adhesive decal 10 one need only peel the remaining liner layer 50 from the top of the decal 10, press the decal 10 firmly on dry clean skin with adhesive side down and wet thoroughly with water, see FIGS. 1 and 4. After waiting approximately sixty seconds the paper backing 12, the 60# C2S, may be slid off. The decal 10 cannot be removed with soap and water but rather must be removed with a solvent such as rubbing alcohol or baby oil.

What is claimed:
1. A process for producing a multi-color decal suitable for application to the skin comprising the steps of:
 (a) coating one side of a roll of porous decal backing paper with a very thin, uniform water soluble release layer;
 (b) coating the water soluble release layer with a very thin, flexible extensible, uniform water-resistant film, maintaining the roll configuration of the paper;
 (c) flexographic printing producing a very thin translucent multi-color design on the water-resistant film;
 (d) coating of the design with a very thin, uniform layer of a transparent or translucent, adhesive, maintaining roll configuration;
 (e) covering the adhesive atop the decal design with a liner weight paper;
further comprising the steps for producing a multi-color peelable sticker and combining it with the multi-color decal comprising subjecting a roll of ink-accepting paper having a backing paper attached by an adhesive, to continuous:
 (f) flexographic printing producing a multi-color design on the ink-accepting paper; and
 (g) gluing the multi-color peelable sticker's backing paper atop the multi-color decal's liner weight paper, maintaining roll configuration, thereby forming the combination sticker and decal into a singular product capable of separation by the user into its sticker and decal components.
2. The process for producing a multi-color decal of claim 1, further comprising the step of printing instructions for using the decal on the decal backing paper opposite the side where the release layer, water resistant film and design are applied.
3. The process for producing a multi-color decal suitable for application to the skin of claim 1, further comprising the step of cutting the roll configuration decals into user-friendly size pieces, each containing a plurality of decals.
4. A process for producing a singular product which is the combination of a multi-color decal suitable for application to the skin and a multi-color peelable sticker, comprising the steps of producing the multi-color decal comprising:
 (a) coating one side of a roll of porous decal backing paper with a very thin, uniform water soluble release layer;
 (b) coating the water soluble release layer with a very thin, flexible, extensible, uniform water-resistant film, maintaining the roll configuration of the paper;
then subjecting the coated roll to continuous:
 (c) flexographic printing producing a very thin translucent multi-color design on the water-resistant film;
 (d) coating of the design with a very thin, uniform layer of a transparent or translucent, adhesive; and
 (e) covering of the adhesive atop the decal design with a liner weight paper, maintaining roll configuration;
further comprising the steps of producing a multi-color peelable sticker and combining it with the multi-colored decal, comprising:
 (f) coating a roll of liner weight sticker backing paper with a very thin, uniform layer of removable adhesive;
 (g) topping the layer of removable adhesive with an ink-accepting paper;
then subjecting the coated roll with ink-accepting paper to continuous:
 (h) flexographic printing producing a multi-color design on the ink-accepting paper; and

(i) gluing of the multi-color peelable sticker's backing paper atop the multi-color decal's liner weight paper, maintaining roll configuration, thereby forming the combination sticker and decal into a singular product capable of separation by the user into its sticker and decal components.

5. The process for producing a singular product which is the combination of a multi-color decal suitable for application to the skin and a multi-color peelable sticker of claim 4, further comprising the step of printing instructions for using the decal and sticker on the decal backing paper opposite the paper side where the release layer, water resistant film and design for the decal are applied.

6. The process for producing a singular product which is the combination of a multi-color decal suitable for application to the skin and a multi-color peelable sticker of claim 4, further comprising the step of cutting the roll configuration combination sticker and decal into user-friendly size pieces, each containing a plurality of stickers atop underlying decals.

\* \* \* \* \*